United States Patent Office 3,494,831
Patented Feb. 10, 1970

3,494,831
PROCESS FOR PRODUCING L-LYSINE FROM
5-(4-AMINOBUTYL)-HYDANTOIN
Kiyoshi Nakayama, Sagamihara-shi, and Hiroshi Hagino, Hachioji-shi, Japan, assignors to Kyowa Hakko Kogyo Co., Ltd., Tokyo, Japan
No Drawing. Continuation of application Ser. No. 563,082, July 6, 1966. This application Aug. 6, 1968, Ser. No. 750,450
Claims priority, application Japan, Mar. 14, 1966, 41/15,375
Int. Cl. C12d 13/06
U.S. Cl. 195—29                7 Claims

ABSTRACT OF THE DISCLOSURE

A process for producing L-lysine by fermentation. D-, L- or DL-5-(4-aminobutyl)-hydantoin is added to an aqueous nutrient medium inoculated with a micro-organism capable of cleaving a hydantoin ring by hydrolysis or which contains an enzyme produced by said microorganism or a substance including the same. Reaction takes place under aerobic conditions whereby L-lysine is produced.

---

This application is a continuation of copending application Ser. No. 563,082 filed on July 6, 1966 now abandoned.

This invention relates to a process for producing L-lysine. More particularly, it relates to a process for the production of L-lysine by biochemical hydrolysis. Even more particularly, the invention relates to a process for the production of L-lysine by biochemical hydrolysis from 5-(4-aminobutyl)-hydantoin.

Processes employed in the prior art for the production of L-lysine include extraction from the natural protein hydrolysate solution, fermentation, synthesis, which comprises producing DL-lysine from various starting materials with certain organic compounds and then subsequently optically resolving the product, and the like. In the synthesis method, for example, the procedures of optical resolution and racemization are required. Therefore, it is economically disadvantageous and improvements thereon have long been sought.

L-lysine, 2,6-diaminohexanoic acid, is an essential amino acid well known in the art. It has been used in the area of food enrichment, whereby the supplementation of wheat-based foods with lysine improves their protein quality and results in an improved growth and tissue synthesis. This compound has also been used medically as a nutrient. Thus, it would be most advantageous to have available a process for the production thereof which may be carried out economically and advantageously on an industrial scale.

One of the objects of the present invention is to provide an improved process for the production of L-lysine wihch overcomes the disadvantages and deficiencies of the prior art methods.

Another object of the present invention is to provide a process for producing L-lysine which may be carried out in an efficacious and simple manner.

A further object of the instant invention is to provide a process for producing L-lysine which gives the product in high purity and good yield.

A still further object of the invention is to provide a process for producing L-lysine which may be carried out advantageously on an industrial scale at relatively low cost to give a high yield of product.

These and other objects and advantages of the present invention will become apparent to those skilled in the art from a consideration of the following specification and claims.

In accordance with the present invention, it has been found that large quantities of L-lysine are obtained by converting 5-(4-aminobutyl)-hydantoin to L-lysine by biochemical hydrolysis wherein D-, L- or DL-5-(4-aminobutyl)-hydantoin is reacted catalytically in the presence of microorganisms which are capable of cleaving the hydantoin ring by hydrolysis or their enzymes, or substances containing the same, in an aqueous nutrient medium or a solvent having a pH of about 6 to 11. Under optimum conditions, L-lysine may be almost quantitatively produced in a yield of about 90 to 95% by this process irrespective of the particular L-, D-, or DL form of 5-(4-aminobutyl)-hydantoin employed as the starting material.

The starting material in the present invention, 5-(4-aminobutyl)-hydantoin, is an intermediate in the synthesis method for making L-lysine chemically wherein furfural is used as the starting material. The present inventors found that L-lysine is produced by the cleavage hydrolysis of the hydantoin ring when the enzymes contained in the cells of particular microorganisms react with 5-(4-aminobutyl)-hydantoin under appropriate conditions. It has further been found that high yields of L-lysine are produced by this process with either the L-, D-, or DL form of 5-(4-aminobutyl)-hydantoin. The process of the present invention, as described herein, has been unknown heretofore in the field of microbiochemistry.

It is known in the art that in the conventional chemical hydrolysis L-lysine, D-lysine and DL-lysine are produced from L-5-(4-aminobutyl)-hydantoin, D-5-(4-aminobutyl)-hydantoin, and DL-5-(4-aminobutyl)hydantoin, respectively. Accordingly, optical resolution of the DL-lysine and the D-lysine after racemization have been necessary in order to convert all of the DL-5-(4-aminobutyl)-hydantoin to L-lysine. In contradistinction thereto, the biochemical hydrolysis of the present invention is entirely different from the prior art chemical hydrolysis. In particular, L-lysine is produced from the starting material L- or D-form of 5-(4-aminobuty)-hydantoin in every case. Hence, it is unnecessary in the present process to convert D-lysine to L-lysine since the optical isomerization of D-5-(4-aminobutyl)-hydantoin and the cleavage hydrolysis of the hydantoin ring occur within the same reaction medium and at almost the same time. This is obviously of advantage in obtaining a process which may be used on a commercial scale.

The microorganisms which may be employed in the present invention are those which have the ability to cleave the hydantoin ring by hydrolysis and the property of converting 5-(4-aminobutyl)-hydantoin to L-lysine in a ratio of greater than 2 mole percent when a screening test is carried out for 72 hours under the conditions described herein. The said screening test comprises mixing the viable microorganism cells (0.1–0.3 g. reduced as the dried material) with an aqueous solution of 0.5% by weight of DL-5-(4-aminobutyl)-hydantoin (30 ml.), carrying out the reaction thereof at a pH of 6–11 and at a temperature of 30–37° C. for 72 hours and then quantitatively estimating the amount of resulting L-lysine or the salt thereof produced.

Bacteria, molds, yeasts, actinomycetes, and imperfect fungi which pass the screening test described hereinabove may be employed as the microorganism in the process of the present invention. Such microorganisms are extensively distributed. Generally, bacteria provide the best results.

Of particular advantage in the present invention are the following families belonging to pseudomonadales and Eubacteriales: i.e., pseudomonadaceae, Spirillaceae, Enterobacteriaceae, Achromobacteraceae, Micrococcaceae, Brevibacteriaceae, Corynebacteriaceae, Bacillaceae, etc. However, as noted above, microorganisms which pass the above-mentioned screening test may also be used in the present invention even if they do not belong to the family and order as described herein.

Representative genera of bacteria which belong to each of the families described hereinabove include the following [genus classification, Bergey's Manual of Determinative Bacteriology, 7th edition (1957)]: Pseudomonas, Xanthomonas, Aeromonas, Vibrio, Alcaligenes, Achromobacter, Escerichia, Aerobacter, Micrococcus, Brevibacterium, Corynebacterium, Microbacterium, Cellulomonas, Arthrobacter, Bacillus.

Examples of molds, yeasts, actinomycetes and imperfect fungi which may be employed as microorganisms in the present invention include the following [Barnett's Illustrated Genera of Imperfect Fungi, 2nd edition, Burgess (1960)]: Aspergillus, Penicillium, Fusarium, Mucor, Rhizopus, Verticillium, Alternaria and Helminthosporium, as well as [Roddel et al. The Yeast, a Taxonomic Study, Amsterdam, Netherlands]: Saccraromyces, Pichia, Hansenula, Debaryomyces and Lipomyces belonging to Endomycetaceae, and Cryptococcus, Torulopsis, Candida, Trichosporon and Rhodotorula belonging to Cryptococcaceae and [Waksman's The Actinomicetes, Williams and Wilkins (1961)]: Streptomyces, Nocardia, Thermoactinomyces, Waksmania and Actinoplanes.

The species of microorganisms listed below have been found to particularly be advantageous in the present invention. Moreover, mutant strains thereof as well as strains analogous thereto may readily be employed. The specific strains include:

*Aerobacter aeroganes* KY 3052
*Arthrobacter flavescens* KY 3154
*Arthrobacter paraffineus* KY 4311 (ATCC 19065)
*Arthrobacter roseoparaffineus* KY 4301 (ATCC 15584)
*Bacillus cereus* KY 3315
*Bacillus circulans* KY 3324 (ATCC 7049)
*Bacillus coagulans* KY 3325 (ATCC 9966)
*Bacillus licheniformis* KY 3332
*Bacillus macerans* KY 3340 (NRRL-B-388)
*Bacillus polymyxa* KY 3350 (NRRL-694)
*Bacillus subtilis* KY 3363
*Brevibacterium helvolum* KY 3468
*Brevibacterium ketoglutamicum* KY 4305 (ATCC 15588)
*Brevibacterium linens* KY 3471
*Cellulomonas cellasea* KY 3491 (ATCC 487)
*Cellulomonas flavigena* KY 3492 (ATCC 482)
*Cellulomonas gelida* KY 3494 (ATCC 488)
*Corynebacterium michiganense* KY 3533
*Corynebacterium poinsettiae* KY 3539 (ATCC 9682)
*Micrococcus paraffinolyticus* KY 4306 (ATCC 15582)
*Micrococcus glutamicus* [1] (ATCC 13286)
*Pseudomonas fluorescens* KY 3954 (NRRL-B-6)
*Pseudomonas riboflavina* KY 3959
*Vibrio percolans* KY 4171 (ATCC 15922)
*Endomyces fibuliger* KY 5124
*Kloeckera corticis* KY 5203
*Schizosaccharomyces octosporus* KY 5391
*Saccharomyces pastorianus* KY 5460
*Candida mycoderma* KY 5804
*Aspergillus awamori* KY 3

The enzymes necessary for the process of the present invention are prepared by culturing the microoganisms in accordance with conventional procedures. Such procedures include carrying out the culturing in a nutritional liquid medium or using a solid surface culture, depending upon the particular requirements and expediencies involved.

As for the composition of the culture medium, either a synthetic or a natural culture medium is suitable as long as it contains the essential nutrients for the growth of the microorganisms employed. Such nutrients are well known in the art and include substances such as a carbon source, a nitrogen source, inorganic compounds and the like which are utilized by the strain employed in appropriate amounts. Thus, as a carbon source, there may be mentioned, by way of example, glucose, fructose, mannoise, galactose, sucrose, maltose, lactose, trehalose, cellobiose, raffinose, arabitol, mannitol, sorbitol, inositol, xylose, arabinose, starch hydrolysate, waste molasses and the like. These substances may be used eiether alone or in mixtures of two or more. As a nitrogen source, various kinds of inorganic or organic compounds or salts such as ammonia, ammonium sulfate, ammonium chloride, ammonium nitrate, ammonium carbonate, ammonium acetate, etc., nitrates, urea, or other compounds containing nitrogen, such as peptone, casein hydrolysate, meat extract, yeast extract, cornsteep liquor, distillers solubles, fish meal, defatted soybean residue, chrysalis, fermentation dregs and the like may be employed. The nitrogen-containing substances may also be used either singly or in combinations of two or more. Furthermore, it may be necessary to add to the culture medium essential nutrients for the growth of the strain such as amino acids, for example, aspartic acid, glutamic acid, threonine, methionine, etc., and/or vitamins, for example, biotin, thiamine, cabalamin, etc. Inorganic compounds which may be added to the culture medium include potassium dihydrogen phosphate, potassium monohydrogen phosphate, magnesium sulfate, calcium carbonate, manganese sulfate, and the like.

Culturing is generally carried out at a temperature of about 15° to 50° C. and a pH of about 4.0 to 9.0. Aerobic conditions are employed therefor, and the growth of the microorganisms is sometimes accelerated by conducting culturing with agitation, such as aerobic shaking of the culture or with stirring of a submerged culture with the introduction of sterilized air thereinto.

It is advantageous to appropriately increase the amount of essential enzymes present by adding a small amount of 5-(4-aminobutyl)-hydantoin to the culture medium. A partial or the total amount of 5-(4-aminobutyl)-hydantoin may be added to the culture medium prior to the beginning of culturing. In such a case, the culturing and the reaction process take place in parallel. The enzymes essential for the process of the present invention may be utilized in the form of substances resulting from the culturing of microorganisms, living cell bodies, the substances obtained by the grinding up of cell bodies, the substances obtained by the extraction of cell bodies and the like. However, generally, the most optimum reaction is obtained by using the culture liquor as it is.

The following examples are given merely as illustrative of the present invention and are not to be considered as limiting. Unless otherwise indicated, the percentages therein are by weight per liter of water.

EXAMPLE I

Ten ml. of a culture medium consisting of 1% of glucose, 0.2% of ammonium sulfate, 0.05% of $K_2HPO_4$, 0.05% of $KH_2PO_4$, 0.025% of $MgSO_4 \cdot 7H_2O$, 0.3% of yeast extract and 0.3% of $CaCO_3$ contained in a large-sized test tube is sterilized and D- or L-5-(4-aminobutyl)-hydantoin is added thereto to give a concentration thereof 5 mg./ml. Various microorganisms, as shown in Table 1, are inoculated into the thus prepared culture medium. Culturing is carried out with aerobic shaking at 30° C. for 96 hours. The various yields of L-lysine obtained in the culture liquor are shown in Table 1.

[1] This microorganism has been reclassified to coryneform at the present: Amino Acid, vol. 2, 42 (1960).

TABLE 1

| Micro-organisms employed | Yield of L-lysine from 5-(4-aminobutyl)-hydantoin | |
|---|---|---|
| | D-form, percent | L-form, percent |
| Aerobacter aerogenes KY 3052 | 51 | 51 |
| Arthrobacter flavescens KY 3154 | 49 | 49 |
| Bacillus cereus KY 3315 | 49 | 53 |
| Bacillus subtilis KY 3363 | 28 | 25 |
| Cellulomonas cellasea KY 3491 ATCC 487 | 53 | 49 |
| Brevibacterium linens KY 3471 | 56 | 56 |
| Corynebacterium poinsettiae KY 3539 ATCC 9682 | 49 | 49 |
| Micrococcus paraffinolyticus KY 4306 ATCC 15582 | 49 | 49 |
| Pseudomonas riboflavina KY 3959 | 51 | 51 |
| Vibrio percolans KY 4171 ATCC 15922 | 49 | 51 |
| Endomyces fibuliger KY 5124 | 53 | 53 |
| Candida mycoderma KY 5804 | 56 | 56 |
| Aspergillus awamori KY 3 | 56 | 56 |

EXAMPLE II

Thirty ml. of a culture medium consisting of 0.5% of glucose, 1% of yeast extract, 1% of peptone and 0.3% of sodium chloride is poured into a 250 ml. conical flask and sterilized at 110° C. for ten minutes. The cell bodies of *Pseudomonas fluorescens* KY 3954 (NRRL–B–6), having been cultured in a bouillon-agar slant at 30° C. for 24 hours, are inoculated into said medium. DL-5-(4-aminobutyl)-hydantoin is further added thereto to give a concentration of 0.1% by weight. Culturing is then carried out with aerobic shaking at 30° C. for 24 hours.

The cell bodies are separated from the culture liquor at the end of culturing with a centrifuge and are washed once with a physiological salt solution, the latter being employed in an amount approximately equal to a quarter of the culture liquor. Centrifugal separation is then carried out and the cell bodies collected. Fifty mg. of the cell bodies thus obtained is added to 5 ml. of a phosphoric acid buffer solution ($\frac{1}{15}$ M) containing 50 mg. of DL-5-(4-aminobutyl)-hydantoin at a pH of 8. After 72 hours of reaction, 38.4 mg. of L-lysine is found to be produced in the solution. This represents a 90% theoretical yield.

EXAMPLE III

The same procedure as that described in Example II is carried out except that *Bacillus polymyxa* 3350 (NRRL–694) is employed as the microorganism. As a result, 37.0 mg. of L-lysine is produced in the reaction solution.

EXAMPLE IV

Forty ml. of a culture medium containing 2.5% of glucose, 0.5% of ammonium chloride, 0.05% of $KH_2PO_4$, 0.05% of $MgSO_4 \cdot 7H_2O$, 0.2% of N-Z-amine (a trademark for a series of casein hydrolysates) and 0.5% of $CaCO_3$ is poured into a 250 ml. conical flask and sterilized. Then, 0.5% by weight of L-5-(4-aminobutyl)-hydantoin is added thereto. *Micrococcus glutamicus* No. 702 ATCC 13286, having been seed-cultured in a bouillon-agar slant at 28° C. for 24 hours, is inoculated into the said culture medium. Culturing is then carried out with aerobic shaking at 30° C. for 72 hours.

At the end of culturing, 2.0 mg./ml. of L-lysine is found to be produced in the solution.

EXAMPLE V

Forty ml. of a culture medium consisting of 2.5% of glucose, 0.2% of ammonium chloride, 0.05% of $KH_2PO_4$, 0.05% of $K_2HPO_4$, 0.05% of $MgSO_4 \cdot 7H_2O$, 0.2% of peptone and 0.5% of $CaCO_3$ is poured into a 250 ml. conical flask. An amount of 0.5% by weight of D-5-(4-aminobutyl)-hydantoin is added thereto. *Micrococcus glutamicus* No. 901 ATCC 13287, having been seed-cultured in a bouillon-agar slant at 37° C. for 24 hours, is added to the culture medium. Culturing is then carried out with aerobic shaking at 30° C. for 72 hours.

At the end of the culturing, 2.58 mg./ml. of L-lysine is found to be produced in the culture liquor.

The invention being thus described, it will be obvious that the same may be varied in many ways. Such variations are not to be regarded as a departure from the spirit and scope of the invention, and all such modifications as would be obvious to one skilled in the art are intended to be included herein.

What is claimed is:

1. A process for producing L-lysine which comprises adding a substance selected from the group consisting of D-, L- and DL-5-(4-aminobutyl)-hydantoin to an aqueous nutrient medium containing a microorganism capable of cleaving a hydantoin ring by hydrolysis, or an enzyme produced by said microorganism or a substance including the same and permitting reaction to take place under aerobic conditions at a pH of about 6.0 to 11.0, whereby L-lysine is produced, and recovering the L-lysine thus produced.

2. The process of claim 1, wherein at least a portion of said hydantoin is added to said aqueous nutrient medium prior to the addition of said microorganism thereto.

3. The process of claim 1, wherein said reaction is carried out at a temperature of from 20° to 35° C.

4. The process of claim 1, wherein said microorganism has the property of converting 5-(4-aminobutyl)-hydantoin to L-lysine in a yield of greater than 2 mole percent when 0.1–0.3 gram of the dried cells of the viable microorganism is reacted with 30 ml. of an aqueous solution of 0.5% by weight of DL-5-(4-aminobutyl)-hydantoin at a pH of from 6.0 to 11.0 and a temperature of from 30° to 37° C. for 72 hours.

5. A process for producing L-lysine which comprises adding a substance selected from the group consisting of D-, L- and DL-5-(4-aminobutyl)-hydantoin to an aqueous nutrient medium containing a microorganism capable of cleaving a hydantoin ring by hydrolysis, culturing the resultant solution under aerobic conditions at a pH of about 4.0 to 9.0 and a temperature of about 15° to 50° C., separating and adding the resultant microorganism cells to a solution having a pH of from about 6.0 to 11.0 and containing a substance selected from the group consisting of D-, L- and DL-5-(4-aminobutyl)-hydantoin and then permitting reaction to take place, whereby L-lysine is produced, and recovering the L-lysine thus produced.

6. The process of claim 5, wherein said microorganism has the property of converting 5-(4-aminobutyl)-hydantoin to L-lysine in a yield of greater than 2 mole percent when 0.1 to 0.3 gram of the dried cells of the viable microorganism is reacted with 30 ml. of an aqueous solution of 0.5% by weight of DL-5-(4-aminobutyl)-hydantoin at a pH of from 6.0 to 11.0 and a temperature of from 30° to 37° C. for 72 hours.

7. The process of claim 6, wherein said reaction is carried out at a temperature of from 20° C. to 35° C.

References Cited

UNITED STATES PATENTS

| 2,979,439 | 4/1961 | Kinoshita et al. | 195—47 |
| 3,056,729 | 10/1962 | Seto | 195—29 |
| 3,320,135 | 5/1967 | Okumura et al. | 195—30 |

LIONEL M. SHAPIRO, Primary Examiner